United States Patent
Sommer

(10) Patent No.: US 10,313,383 B2
(45) Date of Patent: Jun. 4, 2019

(54) SYSTEMS AND METHODS FOR USE IN EVALUATING VULNERABILITY RISKS ASSOCIATED WITH PAYMENT APPLICATIONS

(71) Applicant: MASTERCARD INTERNATIONAL INCORPORATED, Purchase, NY (US)

(72) Inventor: Adam Michael Sommer, Brentwood, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 383 days.

(21) Appl. No.: 15/170,408

(22) Filed: Jun. 1, 2016

(65) Prior Publication Data

US 2017/0353482 A1    Dec. 7, 2017

(51) Int. Cl.
| | |
|---|---|
| *H04L 29/06* | (2006.01) |
| *G06Q 20/40* | (2012.01) |
| *G06Q 20/34* | (2012.01) |
| *G06Q 20/36* | (2012.01) |

(52) U.S. Cl.
CPC ....... *H04L 63/1433* (2013.01); *G06Q 20/356* (2013.01); *G06Q 20/367* (2013.01); *G06Q 20/4016* (2013.01); *H04L 63/20* (2013.01)

(58) Field of Classification Search
CPC ........... G06F 21/10; G06F 21/14; H04L 63/08
USPC .................. 713/150–155; 726/2–7
See application file for complete search history.

(56) References Cited

U.S. PATENT DOCUMENTS

| | | | |
|---|---|---|---|
| 8,156,558 B2 | 4/2012 | Goldfeder et al. | |
| 9,647,834 B2 * | 5/2017 | Thanos | G01D 4/002 |
| 9,794,067 B2 * | 10/2017 | Voloshynovskiy | G06F 21/14 |
| 2008/0120722 A1 | 5/2008 | Sima et al. | |
| 2009/0106846 A1 | 4/2009 | Dupray et al. | |
| 2011/0289588 A1 * | 11/2011 | Sahai | G06Q 90/00 726/25 |
| 2013/0061285 A1 * | 3/2013 | Donfried | G06F 21/316 726/3 |
| 2013/0197998 A1 * | 8/2013 | Buhrmann | G06Q 30/0255 705/14.53 |

(Continued)

*Primary Examiner* — Lynn D Feild
*Assistant Examiner* — Viral S Lakhia
(74) *Attorney, Agent, or Firm* — Harness, Dickey & Pierce, PLC

(57) ABSTRACT

Disclosed are exemplary embodiments of systems and methods for evaluating payment applications based on associated vulnerability risks. In an exemplary embodiment, a method generally includes soliciting, by a computing device, application data associated with a payment application via a vulnerability questionnaire interface, validating, by the computing device, the application data against criterion, and determining, by the computing device, a vulnerability risk score of the application based on the application data. The method also includes approving, by the computing device, the application when the vulnerability risk score satisfies an approval threshold, denying, by the computing device, the application when the vulnerability risk score satisfies a denial threshold, and referring, by the computing device, the application for manual decision when the vulnerability risk score satisfies a manual decision threshold.

19 Claims, 6 Drawing Sheets

(56) References Cited

U.S. PATENT DOCUMENTS

| | | | | |
|---|---|---|---|---|
| 2013/0318614 A1* | 11/2013 | Archer | G06F 21/577 | 726/25 |
| 2014/0007244 A1* | 1/2014 | Martin | G06F 21/577 | 726/25 |
| 2014/0032932 A1* | 1/2014 | Hiar | G06F 11/366 | 713/190 |
| 2014/0188728 A1* | 7/2014 | Dheer | G06Q 20/22 | 705/44 |
| 2015/0142666 A1* | 5/2015 | Landrok | G06Q 20/3226 | 705/67 |
| 2015/0142673 A1* | 5/2015 | Nelsen | G06Q 20/385 | 705/76 |
| 2015/0142700 A1* | 5/2015 | Best | G06N 5/04 | 706/11 |
| 2015/0180875 A1* | 6/2015 | Kay | H04W 12/08 | 726/4 |
| 2015/0310217 A1* | 10/2015 | Artes | G06F 21/577 | 726/25 |
| 2016/0117673 A1* | 4/2016 | Landrok | G06Q 20/3829 | 705/71 |
| 2016/0132678 A1* | 5/2016 | Bell, Jr. | H04L 63/20 | 726/1 |
| 2016/0171415 A1* | 6/2016 | Yampolskiy | H04L 63/1433 | 705/7.28 |
| 2016/0212126 A1* | 7/2016 | Sadacharam | H04L 63/0861 | |
| 2016/0321452 A1* | 11/2016 | Richardson | G06F 21/50 | |
| 2016/0337403 A1* | 11/2016 | Stoops | H04L 63/0861 | |
| 2017/0168918 A1* | 6/2017 | Wieczorek | G06F 11/3664 | |
| 2017/0329966 A1* | 11/2017 | Koganti | G06F 21/554 | |

* cited by examiner

Infrastructure Details

502 — Operating System
- ◉ Microsoft Windows
- ◉ Oracle Solaris
- ◉ Google Chrome OS
- ◉ Mac OS
- ◉ Linux
- ◉ Other 504 — Operating System Version
- ◉ Windows 10
- ◉ Windows 8.1
- ◉ Windows 8
- ◉ Windows 7
- ◉ Other or Not Supported Version 506 — Software Framework
- ◉ C++ language
- ◉ Java language
- ◉ JavaScript language
- ◉ Python language
- ◉ Ruby language
- ◉ Other: ☐

508 — Software Architecture
- ◉ Service-Oriented
- ◉ Object-Oriented
- ◉ Resource-Oriented
- ◉ Other: ☐

510 — Submit

FIG. 5

Compliance Details

- 602 — Has the component's environment been assessed for compliance with PCI DSS? ◉ Yes ◉ No — Supporting Reference: Document1.txt [Upload]
- 604 — If yes, was a PCI Qualified Security Assessor (QSA) or PCI Internal Security Assessor (ISA) used? ◉ Yes ◉ No — Supporting Reference: Document2.txt [Upload]
- 606 — If yes, what type of PCI DSS validation was completed? ◉ ROC ◉ SAQ D ◉ Other: ___ — Supporting Reference: <None> [Upload]
- 608 — Has the component been validated compliant with the PA-DSS? ◉ Yes ◉ No — Supporting Reference: <None> [Upload]
- 610 — If yes, to what version of the PA-DSS was the last validation completed? Version: ___ — Supporting Reference: <None> [Upload]
- 612 — [Submit]

FIG. 6

SYSTEMS AND METHODS FOR USE IN EVALUATING VULNERABILITY RISKS ASSOCIATED WITH PAYMENT APPLICATIONS

FIELD

The present disclosure generally relates to systems and methods for use in evaluating vulnerability risks associated with payment applications (e.g., front-end applications for facilitating digitized payments, back-end applications supporting such front-end applications, etc.) and determining, based on the evaluation, whether to approve, deny and/or further review the payment applications for access to payment accounts.

BACKGROUND

This section provides background information related to the present disclosure which is not necessarily prior art.

Development of applications for use with sensitive user information, such as payment applications, has become increasingly popular as developers attempt to provide increased functionality to users of mobile devices, such as, smartphones, tablets, laptops, appliances, and the like. The developed applications may require access to a user's sensitive information, such as payment account information, as well as sensitive information associated with payment account issuers, which is known to impose a risk that the sensitive information may be compromised when transferred and/or stored by these applications. Because such applications are developed by a variety of different developers, issuers and/or others involved with payment applications often require validation and/or testing of the security of each application as part of the development.

DRAWINGS

The drawings described herein are for illustrative purposes only of selected embodiments and not all possible implementations, and are not intended to limit the scope of the present disclosure.

Figure 1:
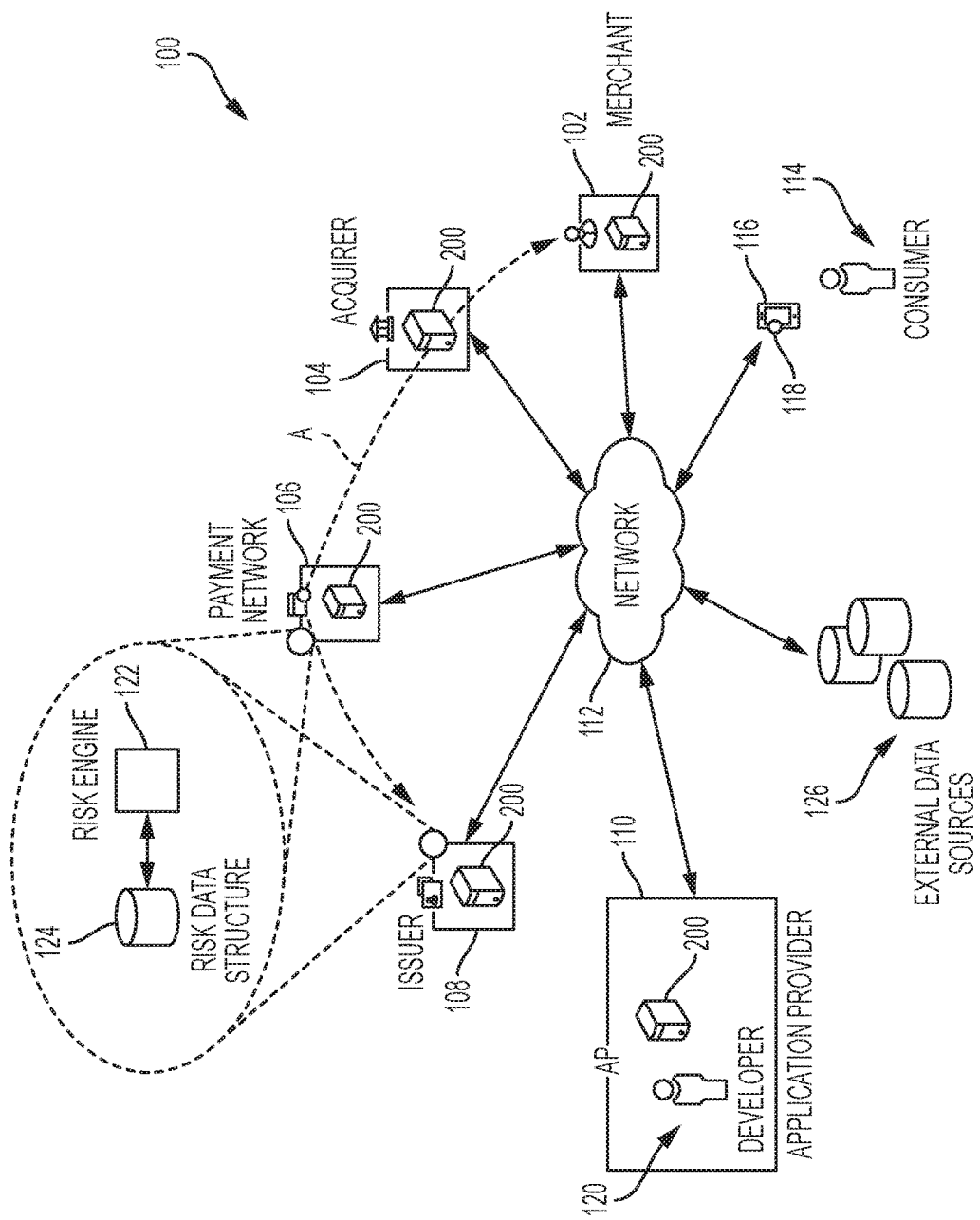
FIG. 1 is a block diagram of an exemplary system of the present disclosure suitable for use in evaluating vulnerability risks of applications and approving or denying the applications based on the evaluation.
Figure 3:
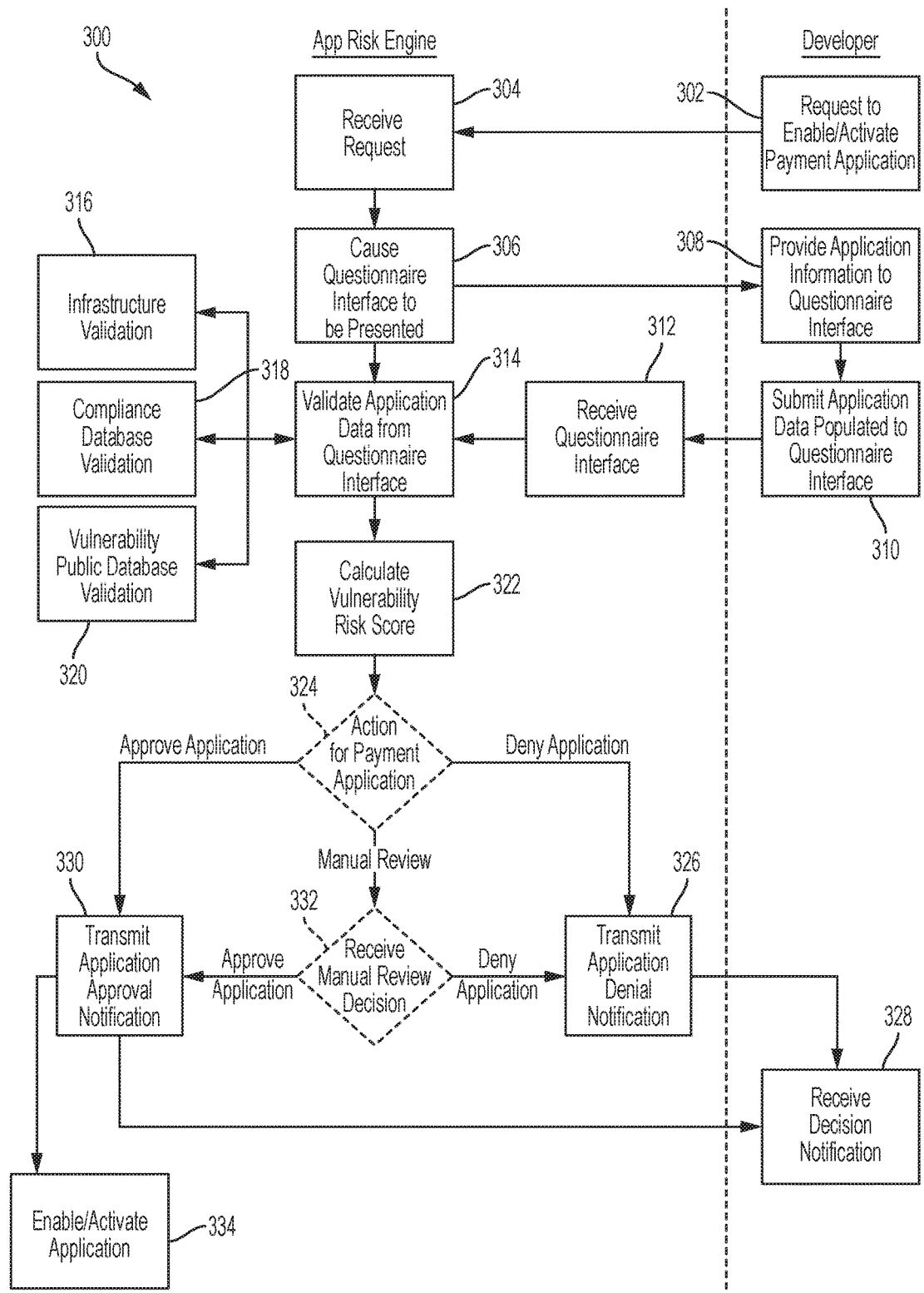
FIG. 3 is an exemplary method, which may be implemented in connection with the system of FIG. 1, for soliciting payment application data and evaluating vulnerability risks of a payment application based on the solicited data.

FIG. 5 is an exemplary interface, which may be implemented in connection with the system of FIG. 1 and/or the method of FIG. 3 for soliciting infrastructure details in connection with evaluating a payment application; and FIG. 6 is an exemplary interface, which may be implemented in connection with the system of FIG. 1 and/or the method of FIG. 3 for soliciting compliance details in connection with evaluating a payment application.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment applications, and other applications that require access to sensitive user data, are often subject to careful scrutiny to verify the security of the data when accessed by the applications and also the general trustworthiness of the applications. While it may be difficult to completely ensure the trustworthiness of an application, analyzing aspects of the application with respect to security criteria, design criteria, known vulnerabilities, and the like, may provide insight as to the potential security risks of the application. Uniquely, the systems and methods herein enable payment account issuers, payment networks, and/or the like, to evaluate an application based on vulnerability risks. In particular, for example, the system may solicit application data from the developer, validate the application data against defined criteria, calculate a vulnerability risk score of the application, and then decide, based on comparing the vulnerability risk score to one or more defined thresholds, whether to approve or deny the application access to sensitive information, or, in some instances, even submit the application for manual review. In this manner, scrutiny of applications that may access sensitive information is enhanced, thereby improving the trustworthiness of approved applications and the security of the sensitive information.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending on, for example, implementation of applications, processing of transactions and storing of transaction data, etc.

Referring to FIG. 1, the system 100 generally includes a merchant 102, an acquirer 104, a payment network 106, an issuer 108, and an application provider 110, each coupled to (and in communication with) network 112. The network 112 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 112 includes multiple networks, where different ones of the multiple networks are accessible to different ones of the illustrated parts in FIG. 1. In this example, the network 112 may include a private payment transaction network made accessible by the payment network 106 to the acquirer 104 and the issuer 108 and, separately, a public network (e.g., the Internet, etc.) through which the issuer 108 and the application provider 110, for example, may communicate (e.g., via network-based applications, etc.).

In the system 100, the merchant 102 offers products (e.g., goods and/or services, etc.) for sale to consumers, including to consumer 114. The consumer 114 is associated with a payment account, which is issued by issuer 108. The consumer 114 may use the payment account to fund transactions to purchase products from the merchant 102 or other merchants. The payment account is associated with at least a primary account number (PAN), which may be included in and/or on a payment device (e.g., a credit card, a debit card, a fob, etc.) for use by the consumer 114 in initiating transactions. Further, as shown, the consumer 114 is associated with a communication device 116.

The application provider 110, in this exemplary embodiment, provides an application 118 for use in the system 100. The application provider 110 generally embodies two distinct roles: 1) development of the application 118, and 2) hosting of the application 118 after deployment. As shown, the application provider 110 includes a developer 120, which is a person (broadly, a user) associated with the development of the application 118, etc. The developer 120 may include a person (or group of persons) who specifies the application 118 (e.g., defines the infrastructure to support the application 118, etc.), designs the application 118 (e.g., designs application interfaces, etc.), lays out the application 118, writes code forming the application 118, tests the application 118, and/or deploys the application 118, and additionally, or alternatively, may include other persons associated with the application 118. It should be appreciated that the application provider 110 may be the developer 120 himself/herself, a company that employs the developer 120, or the like.

The application provider 110, alone or in combination with one or more other entities, further provides the infrastructure to host the application 118 (e.g., via one or more computing devices that may be consistent with computing device 200 herein, etc.), whereby at least a portion of functionality of the application 118 is dependent on the application provider 110 (and/or other entities associated with the application provider 110). In at least one embodiment, the application provider 110 is segregated, with certain segments (or entities) coordinating the development, and other segments (or entities) supporting the application 118, as deployed.

It should be appreciated that the application 118 provided by the application provider 110 may relate to a variety of different fields and/or segments, which relate to payment transactions or not. And, the application provider 110 may be associated with such various applications. That said, in the illustrated system 100, the application 118 includes a payment application developed by the developer 120 (and/or multiple developers) and deployed by the application provider 110, and functional in conjunction with the application provider 110, etc. In particular (and without limitation), the payment application 118 may include a back-end application that supports digitized payments (via a front end application) at the communication device 116 (or at other devices configured to facilitate payments such as tablets, appliances, watches, thermostats, etc.).

In the exemplary embodiment of FIG. 1, the application provider 110 provides the payment application 118, which is installed at and/or active in the consumer's communication device 116. The payment application 118 may be a standalone application, or may be included within another network-based application such as, for example, a virtual wallet application (e.g., PayPass® from MasterCard, Apple Pay® from Apple, PayWave® from Visa, SamsungPay® from Samsung, etc.), or any other application related to the merchant 102 (or other merchants), the payment network 106, and/or the issuer 108. It should be appreciated that, while the system 100 is described herein in connection with the payment application 118 installed on the communication device 116, other embodiments may include payment applications installed on other devices suitably equipped for digital payments (e.g., tablets, laptops, appliances, watches, thermostats, etc.). It should also be appreciated that, as described above, the payment application 118 may be a back-end application that provides payment management, processing, support, provisioning, and/or security infrastructure on which other front-end payment applications may rely (e.g., in connection with facilitating digitized payments, etc.). However, the payment application 118 may also (or alternatively) include a front-end application that enables user interaction associated with the digitized payment (as supported by the back-end application).

When installed and/or included in the communication device 116, as shown in FIG. 1, the payment application 118 permits the consumer 114 to append his/her payment account to the payment application 118, such that the payment account is able to be used, by the payment application 118, to fund transactions to purchase products. In particular, for example, the consumer 114 appends the payment account to the payment application 118 by providing payment account information/credentials, such as, for example, name, address, contact information, PAN for the payment account, user name, password, expiration date, personal identification number (PIN), card verification value (CVV), etc. In turn, the payment application 118 cooperates with the issuer 108 to provision the communication device 116 (and in particular, the payment application 118) with payment account indicia, often in the form of a token associated with the consumer's payment account. The token or other indicia (like the PAN) may then be used, by the payment application 118 to initiate transactions to the payment account. The token or other indicia is stored in the communication device 116 associated with the PANs, for example, and also in a data structure associated with the payment network 106, with the issuer 108, etc., (and retrieved as part of transactions). Generally, when the token is provisioned and stored in the communication device 116, the communication device 116 is understood to be a "payment device." Alternatively, or additionally, payment account indicia may be in the form of, or may include, digital certificates, public keys, cryptograms, etc.

It should be appreciated that the consumer 114 may further append additional payment accounts to the payment application 118, whereby additional tokens or other indicia would be provisioned thereto (and permitting the consumer 114 to select among different payment accounts to be used to fund transactions). Similarly, if the consumer's payment account is appended to payment applications in one or more other devices, a different token is often provisioned to the different device (e.g., whereby tokens are device specific, etc.).

In use, in an exemplary transaction between the consumer 114 and the merchant 102, the consumer 114 initiates the transaction by presenting the communication device 116 to the merchant 102. The merchant 102 (and in particular, a point of sale (POS) terminal associated with the merchant 102) communicates with the communication device 116, and in particular with the payment application 118 (e.g., via near-field communication (NFC), Bluetooth, radio frequency identification (RFID), optical scan, etc.). In doing so, the merchant 102 captures at least the token from the payment application 118, and also, potentially, the consumer's name and/or other consumer specific (or payment account specific) information, etc. The merchant 102 then communicates an authorization request (e.g., including the payment account token, an amount of the purchase, etc.) to the acquirer 104, along path A in the system 100, as referenced in FIG. 1. In turn, the acquirer 104 communicates the authorization request with the issuer 108, along path A, through the payment network 106, such as, for example, through MasterCard®, VISA®, Discover®, American Express®, etc. The issuer 108 determines whether the payment account is in good standing and whether sufficient funds and/or credit are available to cover the transaction. If approved, an authorization reply (indicating the approval of the transaction) is transmitted back from the issuer 108 to the merchant 102, along path A, thereby permitting the merchant 102 to complete the transaction. The transaction is later cleared and/or settled by and between the merchant 102, the acquirer 104, and the issuer 108. If declined, however, the authorization reply (indicating a decline of the transaction) is provided back to the merchant 102, along the path A, thereby permitting the merchant 102 to halt or terminate the transaction.

Transaction data is generated, collected, and stored as part of the above exemplary interactions among the merchant 102, the acquirer 104, the payment network 106, the issuer 108, and the consumer 114. The transaction data includes a plurality of transaction records, one for each transaction, or attempted transaction. The transaction records, in this exemplary embodiment, are stored at least by the payment network 106 (e.g., in a data structure associated with the payment network 106, etc.), but could be stored in other parts of the system 100 and transmitted as needed or requested. With that said, transaction data may include, for example, primary account numbers (PANs), tokens (or other indicia), amounts of the transactions, merchant IDs, merchant category codes (MCCs), dates/times of the transactions, products purchased and related descriptions or identifiers, account balances, etc.

It should be understood, in view of the above, that the payment application 118 and the application provider 110 are not only exposed to confidential and/or sensitive information associated with the consumer 114, the merchant 102, the acquirer 104, the payment network 106, and/or the issuer 108 (in connection with facilitating payment account transactions), but also may access and/or communicate with computing devices associated with the entities to operate as described above (e.g., to exchange the confidential and/or sensitive information, etc.).

While only one merchant 102, one acquirer 104, one payment network 106, one issuer 108, one application provider 110, one consumer 114, and one communication device 116 are illustrated in FIG. 1, it should be appreciated that any number of these parts may be included in other system embodiments.

Figure 2:
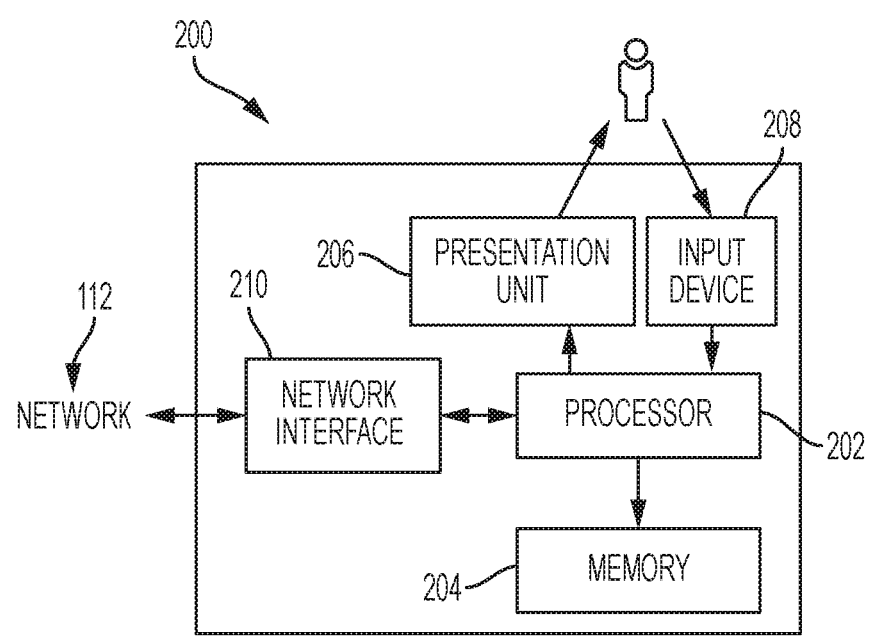
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, tablets, laptops, smartphones, POS terminals, etc. In addition, the computing device 200 may include a single computing device, or it may include multiple computing devices located in close proximity or distributed over a geographic region, so long as the computing devices are specifically configured to function as described herein.

In the exemplary embodiment of FIG. 1, each of the merchant 102, the acquirer 104, the payment network 106, and the issuer 108 are illustrated as including, or being implemented in, computing device 200, coupled to (and in communication with) the network 112. Further, the communication device 116 associated with consumer 114 can also be considered a computing device generally consistent with computing device 200 for purposes of the description herein. With that said, the system 100 should not be considered to be limited to the computing device 200, as described below, as different computing devices and/or arrangements of computing devices may be used. In addition, different components and/or arrangements of components may be used in other computing devices.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account information (e.g., payment account indicia (e.g., tokens, PANs, etc.), expiration dates, consumer contact information, etc.), applications, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information, either visually or audibly, to a user of the computing device 200, such as, for example, the consumer 114 at the communication device 116, etc. It should be further appreciated that various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, a selection of a payment device and/or payment account to append to a payment application (e.g., to the payment application 118, etc.), etc. The input device 208 is coupled to (and is in communication with) the processor 202 and may include, for example, a keyboard, a pointing device, a mouse, a button, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter (e.g., a NFC adapter, a Bluetooth adapter, a RFID adapter, etc.), a mobile network adapter, or other device capable of communicating to/with one or more different networks, including the network 112. Further, in some exemplary embodiments, the computing device 200 includes the processor 202 and one or more network interfaces 210 incorporated into or with the processor 202.

Referring back to FIG. 1, the system 100 also includes a risk engine 122 and a risk data structure 124 coupled to the risk engine 122. The risk engine 122 and the risk data structure 124 may be stand-alone parts of the system 100 or, as indicated by the dotted lines, they may be associated with, together or separately, or implemented by, the issuer 108 and/or the payment network 106. It should be appreciated that the risk engine 122 may be considered a computing device, or may be implemented in a computing device, consistent with computing device 200. In addition, the risk data structure 124 may be included in memory 204 of computing device 200 (in association with the risk engine 122), or separate therefrom.

In general, the risk engine 122 is configured, often by executable instructions, to operate as described herein. For example, the risk engine 122 is configured to evaluate the payment application 118 to determine whether to authorize access, by the payment application 118, to payment account information (e.g., payment account information for the consumer 114, etc.).

In particular, the risk engine 122 is configured to solicit required data, information, parameters, etc., associated with the payment application 118 and/or the infrastructure associated with the application 118, such as environment/platform characteristics, design requirements, functional requirements, encryption schemes used, networking protocols required, standards compliance information, known vulnerability potential information, fraud controls, authentication mechanisms, etc. The risk engine 122 is configured to then store at least part of the data gathered in the risk data structure 124, along with any further inquiries and/or forms/interfaces used by the risk engine 122 to solicit the required data. The risk engine 122 may further be configured to access one or more external data sources 126 (e.g., databases, database management systems, etc.) in order to evaluate the payment application 118. The external data sources 126 may include data structures containing data used to validate aspects of the payment application 118 against defined criteria. For instance, the external data sources 126 may include one or more of an infrastructure validation data structure, a compliance validation data structure, and/or a public vulnerability validation data structure, etc. In addition, the external data sources 126 are typically actively managed sources and may include private data sources (e.g., private to the payment network 106, the issuer 108, etc.), public data sources, or some combination thereof.

In the exemplary embodiment, the risk engine 122 is configured to use the solicited data and/or accessed data to determine a level of vulnerability risk, or a vulnerability risk score (VRS), for the payment application 118 (e.g., based on one or more algorithms from the risk data structure 124, etc.). The risk engine 122 is also configured to compare the vulnerability risk score to pre-defined thresholds, or rules (from the risk data structure 124) to determine whether the payment application 118 should be approved for use or denied.

FIG. 3 illustrates an exemplary method 300 for evaluating vulnerability risks of applications, and in particular, payment applications. The method 300 is generally described as implemented in the risk engine 122 of the system 100, with reference to the application provider 110 (e.g., the developer 120, etc.) and further with reference to the computing device 200. It should be appreciated, however, that the methods herein (including the method 300) are not limited to the system 100 and the computing device 200, and conversely that the systems and computing devices herein are not limited to method 300. Further, the method 300 is described with reference to exemplary interfaces 400-600, shown in FIGS. 4-6. The method 300, however, should not be understood to be limited to the exemplary interfaces 400-600, as other interfaces, or no interfaces, may be employed in methods described herein.

In method 300, the application provider 110, and in particular the developer 120, requests, at 302, to enable, or activate, the payment application 118 for use in initiating payment account transactions in the system 100. The request is generally directed to a network-based application associated with the risk engine 122, or otherwise, via the network 112. The risk engine 122, in turn, either directly or indirectly, receives, at 304, the request from the application provider 110.

Upon receiving the request, the risk engine 122 causes, at 306, a vulnerability questionnaire interface to be presented (e.g., displayed, etc.) to the developer 120 (or other user associated with the application provider 110 and/or the payment application 118), at presentation unit 206. The vulnerability questionnaire interface is configured to solicit data, information, parameters, etc., associated with the payment application 118 from the developer 120 (e.g., regarding infrastructure, compliance, etc.). In some embodiments, the vulnerability questionnaire interface may include form interfaces enabling the developer 120 to manually fill in and/or select payment application information related to the payment application 118. Further, the vulnerability questionnaire interface may enable the developer 120 to upload the payment application 118 and/or data associated with the payment application 118 from which the risk engine 122 may extract certain data and/or information. The vulnerability questionnaire interface may also automatically populate queries and/or form entries with information that the developer 120 may have already provided in the original request to activate the payment application 118.

In turn, the developer 120 views, accesses, and/or interacts with the vulnerability questionnaire interface to provide the solicited information/data associated with the payment application 118, at 308.

Figure 4:
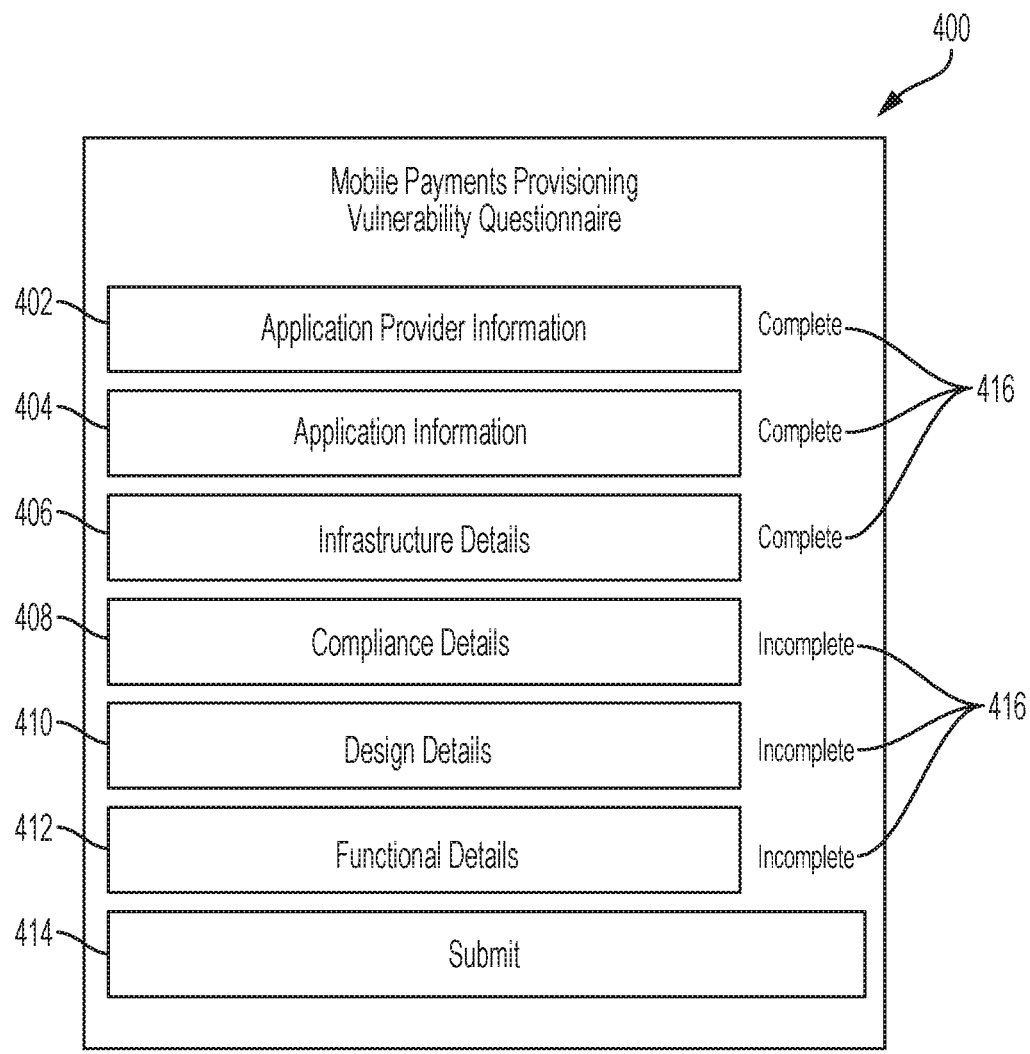
FIG. 4 is an exemplary interface, which may be implemented in connection with the system of FIG. 1 and/or the method of FIG. 3 for soliciting payment application data in connection with evaluating a payment application.

FIG. 4 illustrates an exemplary vulnerability questionnaire interface 400 that may be used for soliciting data associated with the application 118, for example, from the developer 120 (e.g., in connection with operation 306 of the method 300, etc.) or other user. The illustrated interface 400 includes an application provider information button 402, an application information button 404, an infrastructure details button 406, a compliance details button 408, a design details button 410, a functional details button 412, and a submit button 414. Further, the interface 400 includes, for each of the buttons 402-412, a completion indicator 416 indicating whether or not details have been provided for the corresponding portions of the interface 400 associated with the various details buttons 402-412. It should be appreciated that the interface 400 is exemplary in nature, and may include other buttons and/or other configurations within the scope of the present disclosure.

Each of the buttons 402-412 in the illustrated questionnaire interface 400, when selected, is generally associated with a data entry interface. In connection therewith, when activated, the buttons 402-412 cause the interface 400 to change into and/or display the corresponding data entry interface. Each data entry interface may include data entry elements enabling the developer 120 to provide data associated with the application 118. The completion indicators 416 display "Incomplete" or the like when the associated data entry interface has not been filled out or only partially filled out. As will be described, the data entry interfaces may include required entry elements and optional entry elements. A completion indicator 416 may display "Incomplete" only when one or more required entry elements are not satisfactorily completed on the associated data entry interface. However, once the required entry elements of a data entry interface are completed, the associated completion indicator 416 may display "Complete". It should be understood that, alternatively or additionally, the completion indicators 416 may include other types of indicators, symbols, or the like that serve to indicate a completion status of the associated data entry interface.

As an example, the application provider button 402 of the questionnaire interface 400, when activated, may cause an application provider data entry interface to be displayed. The application provider data entry interface may solicit, from the developer 120, data or information associated with the application provider 110 of the application 118. The data solicited by the application provider data entry interface may include, for example, a date of submission of the application data, a company name for the provider 110, an address of the company/provider 110, a primary contact, a secondary contact, email addresses, telephone numbers, etc. It should be understood that, in alternative embodiments, more, less, or different data may be solicited with respect to the application provider 110.

The application information button 404 of the questionnaire interface 400, when activated, may cause an application information data entry interface to be displayed. The application information data entry interface may solicit data associated with the application 118, such as, for example, a component (or application) type, functions provided by the component, a card brand provisioned to the application 118, an identifier to be provisioned to the application 118 (e.g., a PAN, a token, etc.), a commercial and/or product name of the application 118, version information and version release date of the application 118, data center information (primary and backup), entity type of the data center, related component and/or application information, etc. It should be understood that, in alternative embodiments, more, less, or different data may be solicited with respect to the application 110.

The infrastructure details button 406 of the questionnaire interface 400, when activated, may cause an infrastructure details data entry interface to be displayed. The infrastructure details data entry interface may solicit data associated with the infrastructure of the application 118, such as, for example, an operating system type and version, a software framework, a build version, a software architecture type, hardware security module information, and a device type. It should be understood that, in alternative embodiments, more, less, or different data may be solicited with respect to the infrastructure of the application 118.

In that regard, an exemplary infrastructure details data entry interface 500 is shown in FIG. 5, which may be displayed in response to selection of the infrastructure details button 406 in the questionnaire interface 400. The interface 500 includes an operating system entry 502, an operating system version entry 504, a software framework entry 506, and a software architecture entry 508. Further, the interface 500 includes a submit button 510 which, when activated, may submit and/or store data provided in the entries 502-508 and cause a different interface to display, such as returning to the questionnaire interface 400. Each of the entries 502-508 in the interface 500 includes a radio button for choosing a selection that best describes the application 118 from a list of possible selections. For instance, in the operating system entry 502, the developer 120 may select one of Microsoft Windows, Oracle Solaris, Google Chrome OS, Mac OS, Linux, or Other. In the exemplary embodiment, the selection for Microsoft Windows is selected.

Based, at least in part, on the selection in the operating system entry 502 of the data entry interface 500, the operating system version entry 504 may display a list of possible selections of versions of the selected operating system in entry 502. For instance, because Microsoft Windows is selected in entry 502, entry 504 displays a list of possible selections of versions of Microsoft Windows, including Windows 10, Windows 8.1, Windows 8, Windows 7, and Other or Not Supported Versions. The developer 120 may select a version that is appropriate based on the application 118 being submitted. In the exemplary embodiment, the developer 120 has selected Windows 10 by activating the associated radio button in the operating system version entry 504.

The software framework entry 506 of the data entry interface 500 displays possible selections of software frameworks that may be supported (or not) by the payment network 106, the issuer 108, the risk engine 122, or other involved parts of the system 100. The selections are displayed in a list, including radio buttons that, when activated, indicate a selection of a software framework that is appropriate based on the application being submitted. In the illustrated interface 500, the selections include C++ language, Java language, JavaScript language, Python language, Ruby language, and Other. The "Other" selection includes a text box that, when activated by selecting the radio button associated with the "Other" selection, enables the developer 120 to input the software framework of the application 118.

The software architecture entry 508 of the data entry interface 500 displays possible selections of software architecture types that may describe the application. The radio button selections include Service-Oriented Architecture, Object-Oriented Architecture, Resource-Oriented Architecture, and Other. Similar to the text box of the software framework entry 506 described above, the "Other" selection includes a text box that may be filled by the developer 120 to further specify the software architecture of the application 118.

It should be understood that, in alternative embodiments, more, fewer, or different selections may be available for each of the entries 502-508 of the data entry interface 500, and that the interface 500 may include more, fewer, or different entries in addition to or in place of entries 502-508. Further, it should be understood that the content of an entry may depend on selections made in other entries. For instance, when a different operating system is selected in entry 502, entry 504 may display more, fewer, or different versions based on the operating system selected and what versions are supported by the risk engine 122 and/or other parts of the system 100. Additionally, it should be understood that alternative embodiments of the interface 500 may make use of more, fewer, or different interface elements, such as drop down menus, text entry boxes, scroll bars, or the like.

Referring again to the questionnaire interface 400 of FIG. 4, the compliance details button 408, when activated, may cause a compliance details data entry interface to be displayed. The compliance details data entry interface may solicit data associated with compliance of the application 118 to relevant standards. For example, the compliance details data entry interface may include (without limitation) queries (or a series of queries) such as:

Has the component's environment been assessed for compliance with PCI DSS?
If yes, was a PCI Qualified Security Assessor (QSA) or a PCI Internal Security Assessor (ISA) used?
If yes, what type of PCI DSS validation was completed? ROC, SAQ D, or Other?
Has the component been validated compliant with the PA-DSS?
If yes, to what version of the PA-DSS was the last validation completed?
Was the last site visit within the past 12 months?
If the component is a Token Service Provider, as defined by EMVCo, has the component been validated compliant with the PCI TSP Security Requirements?

It should be appreciated that, in alternative embodiments, more, less, or different data than identified above may be solicited with respect to the compliance of the application 118 with relevant standards.

FIG. 6 illustrates an exemplary compliance details data entry interface 600 that may be displayed to the developer 120, in response to activation of the compliance details button 408 in the questionnaire interface 400. The interface 600 includes entries for various queries soliciting data associated with compliance of the application 118 to relevant standards. In particular, in the illustrated interface 600 the queries include a PCI DSS entry 602, associated sub-entries 604 and 606, a PA DSS entry 608, and an associated sub-entry 610. In connection with each of the entries 602-610, the developer 120 may upload supporting reference files by activating the appropriate "Upload" buttons of the supporting reference sections. Upon such selection, the interface 600 may change and/or a separate interface may be displayed that enables the user to select a file to upload. Further, the interface 600 also includes a submit button 612 which, when activated, may submit and/or store data provided in the entries 602-610 and cause a different interface to display, such as returning to the questionnaire interface 400.

As shown in FIG. 6, the PCI DSS entry 602 of the compliance details data entry interface 600 includes the query, "Has the component's environment been assessed for compliance with PCI DSS?" The entry 602 further includes radio buttons for "Yes" and "No" responses to the query. Additionally, the entry 602 includes a supporting reference section that enables the user to provide, upload, and/or attach a document that supports the query response. For instance, in the instant embodiment, a document called "Document1.txt" has been uploaded. The sub-entry 604 is associated with entry 602 and includes a query, "If yes, was a PCI Qualified Security Assessor (QSA) or a PCI Internal Security Assessor (ISA) used?" The entry 604 further includes radio buttons for "Yes" and "No" responses to the query, and a supporting reference section which, in this embodiment, includes an uploaded file called "Document2.txt". The sub-entry 606 is associated with entries 602 and 604 and includes a query, "If yes, what type of PCI DSS validation was completed?" The available responses include "ROC" (a "Report on Compliance" completed by a qualified external auditor), "SAQ D" (a "Self-Assessment Questionnaire" that is completed by the developer 120 without trained external help), and "Other". The "Other" response includes a text entry element that enables a user to further specify the type of validation, if "Other" is chosen. The entry 606 further includes a supporting reference section which, in this embodiment, does not include an uploaded file.

The PA DSS entry 608 of the compliance details data entry interface 600 includes a query, "Has the component been validated compliant with the PA-DSS?" The entry 608 further includes radio buttons for "Yes" and "No" responses to the query. Additionally, the entry 608 includes a supporting reference which does not include an uploaded file. The sub-entry 610 is associated with the entry 608 and includes a query, "If yes, to what version of the PA-DSS was the last validation completed?" The entry 610 further includes a text entry element that enables a user to enter a version in response to the query. Additionally, the entry 610 includes a supporting reference which does not include an uploaded file. A user may upload a supporting reference file in connection wither either or both of the entries 608, 610 as described above.

It should again be appreciated that the interface 600 is exemplary in nature and that more, fewer, or different files and/or file types may be provided as supporting references in alternative embodiments. Further, supporting references may be required, allowed, or prohibited depending at least in part on the entry. For instance, entry 602 may require a supporting reference, while entry 606 may not require a supporting reference (but the developer 120 may still be allowed to upload a supporting reference). Alternatively or additionally, the developer 120 may be unable to upload a supporting reference for certain entries.

It should also be appreciated that more, fewer, or different compliance queries may be presented in alternative embodiments of a compliance details data entry interface, than illustrated in the interface 600 of FIG. 6. Further, the display of compliance queries may depend, at least in part, on responses to other compliance queries. For instance, the sub-entries 604 and 606, which are associated with entry 602, may only be displayed when the response in entry 602 is "Yes". Additionally, it should be understood that alternative embodiments of the interface 600 may make use of more, fewer, or different interface elements, such as drop down menus, text entry boxes, scroll bars, or the like.

With reference again back to the questionnaire interface 400 of FIG. 4, the design details button 410, when activated, may cause a design details data entry interface to be displayed (e.g., an interface similar to interfaces 500 and 600 of FIGS. 5 and 6, respectively, etc.). The design details data entry interface may solicit data (e.g., requirements, etc.) associated with design of the application 118, such as, for example (and without limitation), the following requirements:

The component must be located on a secure internal network that is isolated/segmented (as defined by PCI DSS v3) from any untrusted or out-of-scope networks.

Only communications utilizing mutual authentication must be permitted in and out of the component's environment.

Communications (e.g. APIs) between components must be authenticated cryptographically.

Cryptographic operations performed by the component must utilize Hardware Security Modules (HSMs) that have been validated to either (1) FIPS 140-2 level 3 or (2) PCI PTS for all cryptographic functions.

The component must enforce Strong Cryptography (as defined by PCI DSS v3) and security protocols to safeguard all data when stored and during transmission over open, public networks.

The component must be designed to strict configuration standards and must be protected from vulnerabilities (reference PCI PA-DSS v3.0 Requirement 5.2).

It should be appreciated that, in alternative embodiments, more, less, or different data than identified above may be solicited with respect to the design details of the application 118.

The functional details button 412 of the questionnaire interface 400, when activated, may cause a functional details data entry interface to be displayed (e.g., an interface similar to interfaces 500 and 600 of FIGS. 5 and 6, respectively, etc.). The functional details data entry interface may solicit data (e.g., requirements, etc.) associated with functional criterion of the application 118. Such requirements may include, for example:

The component must implement strong access controls and authentication measures in accordance with PCI DSS v3.0 Requirements 7 and 8.

The component should prohibit remote non-consumer user access into the system.

The component must implement logging, monitoring, and alerting as appropriate to identify any suspicious activity and initiate response procedures.

The component should support multi-factor authentication for all non-consumer user access including at-least two of the following: something you know (e.g. password), something you have (e.g. passcode token), something you are (e.g. biometrics).

If the solution is not utilizing tokens, the component must support a mechanism for secure deletion of cardholder data as required by a written data-retention policy.

The solution must have a mechanism to perform velocity checking and alerting based on pre-defined thresholds.

Again, it should be appreciated that, in alternative embodiments, more, less, or different data than identified above may be solicited with respect to the functional details of the application 118.

As can be seen, the various data entry interfaces displayed in response to activation of the buttons 402-412 in the questionnaire interface 400 may enable and/or require the developer 120 (or other user) to provide support for answers to queries, requirements, and/or criterion included in the interfaces. For instance, and as described above, the various data entry interfaces may enable the developer 120 to upload supporting documents to prove compliance with the queries, requirements, and/or criterion. Once the developer 120 provides the data solicited by the various data entry interfaces, as displayed to the developer 120 in response to activation of the buttons 402-412 in the questionnaire interface 400, the developer 120 can activate the submit button 414 in the interface 400 to submit the data provided to the questionnaire interface 400 and the associated data entry interfaces to the risk engine 122. The submit button 414 may be deactivated until each of the data entry interfaces have been satisfactorily completed.

Referring again to FIG. 3, once the solicited application inputs to the vulnerability questionnaire interface are completed, the application provider 110 (and more specifically, the developer 120) submits the inputs via the interface to the risk engine 122, at 310.

In turn, the risk engine 122 receives the submitted application information/data, at 312, and validates the received information/data, at 314. In connection with validating received information, the risk engine collects available information from the data sources 126 for use in the validations, and then logs the results (see Tables 1-3 below). As described above, the data sources 126 may include private data sources (e.g., private to the payment network 106, the issuer 108, etc.), public data sources, or some combination thereof. In turn, the risk engine 122 logs the results of the validations and uses them to calculate the vulnerability risk score for the payment application 118, as described more below.

For example, in the method 300, the risk engine 122 validates, at 316, the received infrastructure details for the payment application 118 against infrastructure criterion (e.g., predefined based on historical data, etc.) collected by the risk engine 122. This may include, without limitation, operating system validation, software framework validation, hardware security module (HSM) validation, etc. In addition, the risk engine 122 validates, at 318, the received compliance details for the payment application against compliance criterion (e.g., predefined based on historical data, etc.) collected by the risk engine 122. This may include, without limitation, publically available compliance listings such as Site Data Protection (SDP) Service Provider validation from MasterCard®, Payment Application Data Security Standard (PA-DSS) validation, etc.

Further, the risk engine 122 validates received information for the payment application 118 against vulnerability criterion collected from and/or stored at the external data sources 126 (e.g., the National Institute of Standards and Technology's National Vulnerability Database (NIST NVD) validation, the Computer Emergency Response Team's Vulnerability Notes Database (CERT VND) validation, The MITRE Corporation's Common Vulnerabilities and Exposures (CVE) List Master validation, etc.). This includes querying the external data sources 126 for vulnerability data associated with the application data submitted by the application provider 110. For instance, in providing information to the vulnerability questionnaire interface 400, the developer 120 may indicate that the payment application 118 uses SSL v3.0 as a channel encryption protocol. In response, the risk engine 122 queries the external data sources 126 for vulnerability data associated with the SSL v3.0 protocol (if any) and logs any query results for use in the vulnerability risk score calculation (together with all other collected data).

It should be appreciated that the data sources used for the validations at 316-320 may be the same data sources for one or more of the validations or different data sources for each. In addition, while the data sources used in the validations may be "external" to the risk engine 122 (although this is not required in all implantations), they may be an internal or private data source associated with one or more of the payment network 106, the issuer 108, or another appropriate entity, organization, or the like (e.g., the Site Data Protection (SDP) Service Provider validation data source). Further, one or more of the data sources may be separate from any particular entity and may be accessible to the public (e.g., the NIST NVD data source potentially used in the validation at 320, etc.).

Once the application information (including the infrastructure and compliance details) and vulnerability information is gathered for the payment application 118 (and validated and logged), the risk engine 122 calculates the vulnerability risk score for the application 118, at 322, based on the gathered information. For example, the vulnerability risk score may be calculated based on answers from the developer 120 to the vulnerability questionnaire interface, and the associated validations, along with the vulnerability query results from the external data sources 126 and the associated validation. In so doing, each possible answer and/or vulnerability query result may be assigned (or logged in association with) a point value that is included in a total value to calculate the vulnerability risk score.

Based on the vulnerability risk score of the application 118, and taking into account any defined vulnerability risk score decision rules and/or thresholds, the risk engine 122 determines an action to take with respect to the payment application 118, at 324. The action taken, at 324, may include denying the application, approving the application, or referring the application for a manual review.

In particular, the risk engine 122 may compare the vulnerability risk score to a threshold (or to multiple thresholds), at 324, and determine the action based on the comparison. For instance, a denial threshold may be defined such that, if the vulnerability risk score of the payment application 118 is equal to or less than the denial threshold (or greater than the denial threshold, depending on the scoring format), the payment application 118 is denied for activation/enablement with respect to payment accounts associated with the risk engine 122 (e.g., if the risk engine 122 is associated with the issuer 108, the payment application 118 may be denied for activation/enablement for payment accounts issued by the issuer 108; etc.). Further, an approval threshold may be defined such that, if the vulnerability risk score of the payment application 118 is equal to or greater than the approval threshold (or less than the approval threshold, depending on the scoring format), the payment application 118 is approved for activation/enablement with respect to payment accounts associated with the risk engine 122 (e.g., again, if the risk engine 122 is associated with the issuer 108, the payment application 118 may be approved for activation/enablement for payment accounts issued by the issuer 108; etc.). In some embodiments, there may be a gap (e.g., defining a manual decision threshold, etc.) between the denial threshold and the approval threshold (e.g., the denial threshold and the approval threshold may be different thresholds, etc.). For instance, if a vulnerability risk score is provided on a scale from 1 to 100, a denial threshold may be defined at 40 (and below) and an approval threshold may be defined at 60 (and above). Here, if the payment application 118 is assigned a vulnerability risk score between 40 and 60, it may be referred for manual review. It should be understood that, in alternative embodiments, thresholds may be greater than, less than, or different than above. In addition, in some embodiments, a single threshold may be used as both the approval threshold and the denial threshold (and, potentially, with no manual review threshold).

Based on the comparison (at 324), when the payment application 118 is denied, the risk engine 122 sends an application denial notification to the application provider 110 (and/or the developer 120), at 326. In turn, the developer 120 (broadly, the application provider 110) receives the notification, at 328. The notification may include, for example, a message instructing the developer 120 that the payment application 118 was denied, and may further include a reason and/or explanation for the denial. For instance, if some aspect of the payment application 118 was found to present a significant vulnerability risk, the denial notification may include information identifying that aspect. In addition, the notification may be received by the developer 120 via an interface with the risk engine 122, such as a website or similar network-based interface. Alternatively or additionally, the developer 120 may receive the notification via electronic mail, internet-based message, SMS message, voice message, or the like.

When the payment application 118 is approved (at 324), the risk engine 122 sends an application approval notification to the application provider 110 (and/or the developer 120), at 330. In turn, the developer 120 (broadly, the application provider 110) again receives the notification, at 328 (e.g., via an interface with the risk engine 122, via electronic mail, via an Internet-based message, via an SMS message, via a voice message, etc.). The approval notification may include, for example, a message instructing the developer 120 that the payment application 118 has been approved. Further, the approval notification may include additional information for managing or handling the approval, such as a unique token or identifier that the developer 120 may add to the payment application 118 in order to authenticate the payment application 118 for payment transactions. Further, the risk engine 122 may provide approval notices associated with the approved payment application 118 to other internal systems, for example, of the payment network 106, the issuer 108, etc. (e.g., back-end infrastructure management systems, franchising management systems, connectivity management systems, etc.) to inform them about the newly approved payment application 118. The approval notices may include information enabling the internal systems to properly handle, manage, and/or process interactions with the approved payment application 118.

When the payment application 118 is referred for manual review, the payment application 118 is sent, transmitted, provided, or made available to a user, or reviewer, for review by the risk engine 122. Along with the payment application 118, the risk engine 122 may also provide (or make available) the information/data submitted by the developer 120 in connection with the vulnerability questionnaire interface, the vulnerability information from the external data sources 126, and the vulnerability risk score to the reviewer. In response, the reviewer submits a decision regarding the payment application 118 based on the provided information, and the risk engine 122 receives the reviewer's decision, at 332. If the decision indicates denial of the application 118, the risk engine 122 again sends a denial notification to the application provider 110 (and/or the developer 120), at 326, which in turn is received by the application provider 110 (and/or the developer 120), at 328. Alternatively, if the decision indicates approval of the application 118, the risk engine 122 sends an approval notification to the application provider 110 (and/or the developer 120), at 330, which is then received by the application provider 110 (and/or the developer 120), at 328. It should be appreciated that the reviewer, providing the manual evaluation of the payment application 118, may be an employee of the payment network 106, the issuer 108, or other entity associated with the risk engine 122.

Finally in the illustrated method 300, when the payment application 118 is approved (at 324), the risk engine 122 also enables or activates the payment application at 334. Activation may include adding an identifier of the payment application 118 to an "approved application" data structure, for example, in memory 204 in the risk data structure 124 or in another similar data structure. Further, the risk engine 122 may generate or cause to be generated a unique authorization token or tokens associated with the approved payment application 118 that may be provided to instances of the payment application 118 to authorize the payment application instance for transactions associated with payment accounts. Activation or enablement of the payment application 118 may further result in the payment application 118 appearing on an application marketplace, enabling consumers (e.g., consumer 114, etc.) to access, download, and/or install the payment application 118 (e.g., at the consumer's communication device 116 as shown in FIG. 1, etc.).

For example, the consumer 114, when deciding to install/use the payment application 118, may be provided a token associated with the payment application 118 and with the consumer's payment account for use during transactions via the payment application 118. In connection therewith, the consumer 114 may download the payment application 118 onto the communication device 116 and configure the payment application 118 to be linked or associated with the payment account of consumer 114. By linking the payment application 118 on the communication device 116 to the payment account, the payment application 118 may be sent a token associated with the payment account of the consumer 114 by the issuer 108 of the payment account, or alternatively by the payment network 106 or other appropriate entity.

An exemplary vulnerability risk score for the payment application 118, and calculation thereof, is described next. Table 1 includes various potential questions/queries that may be included in an example vulnerability questionnaire interface (e.g., interface 400, etc.) relating to the payment application 118, and the available answers/responses and their assigned point values (e.g., for use in validating responses provided by the developer 120 to queries in interface 400 regarding the payment application 118, etc.). In connection therewith, Table 1 includes four columns: a question identifier column, an application attribute column identifying the attribute associated with the question, a column with a set of possible responses to the questions, and a column indicating an impact of the particular question/response on the vulnerability risk score (VRS). For instance, the first question in Table 1, identified as SEC_Q_01, is directed toward identifying the "component type" of the payment application 118. Possible responses to the first question, and their associated impact on the vulnerability risk score (VRS), include: "Credential Management", having a zero point impact; "Account Enablement", having a zero point impact; "Transaction Management", having a −0.2 point impact; and "Mobile Payment Application", having a −0.5 point impact. Regarding the impact of each possible response on the vulnerability risk score, in this example, negative impact values indicate that, based on the response, the payment application 118 has a higher vulnerability risk (i.e., the payment application 118 is more likely to be vulnerable to security threats and/or issues).

TABLE 1

| Question ID | Attribute | Response | VRS Impact |
| --- | --- | --- | --- |
| SEC_Q_01 | Component Type | Credential Management | 0 |
| | | Account Enablement | 0 |
| | | Transaction Management | −0.2 |
| | | Mobile Payment Application | −0.5 |
| SEC_Q_02 | Functions Provided | Generate & Map Tokens | −0.5 |
| | | Generate Digitalized Card Data | 0 |
| | | Generate Card Master Keys | −0.5 |
| | | Provision Digitized Card Data to MPA | −0.1 |
| | | Provision Keys to MPA | −0.5 |
| | | Remote Management of MPA | −0.1 |
| | | Cryptographic Validation | −0.5 |
| | | Fraud Management | 1 |
| | | De-Tokenization | −0.5 |
| SEC_Q_03 | Card Product Type | Credit | 0 |
| | | Debit | −0.1 |
| | | Prepaid | −0.3 |
| SEC_Q_04 | Primary Data Type | PAN | −1 |
| | | Payment Token | 10 |
| | | Issuer Token | 5 |
| | | Acquirer Token | 3 |
| SEC_Q_05 | Data Center Provider | Issuer | 0.5 |
| | | Third-Party | −1 |
| SEC_Q_06 | Host Server Type | Microsoft Windows | −0.5 |
| | | Oracle Solaris | 0.5 |
| | | Google Chrome OS | 0.5 |
| | | Mac OS | 0.3 |
| | | Open SUSE | 0.3 |
| | | Red Hat Enterprise Linux | 0.5 |
| | | Other Linux | 0 |
| SEC_Q_07 | Operating System Version | OPEN ENDED | |
| | | IF Most Current | 5 |
| | | IF Currently Supported | 0.5 |
| | | IF Not Supported | −2 |
| SEC_Q_07.1 | IF Microsoft Windows | Windows 10 | 1 |
| | | Windows 8.1 | 0.5 |
| | | Windows 8 | 0.5 |
| | | Windows 7 | 0.3 |
| | | Windows Server 2016 | 1 |

TABLE 1-continued

| Question ID | Attribute | Response | VRS Impact |
|---|---|---|---|
| | | Windows Server 2012 | 0.5 |
| | | Windows Server 2008 | 0.3 |
| | | Other or Not Supported Versions | −1 |
| SEC_Q_07.2 | IF Oracle Solaris | Version 8 | 0 |
| | | Version 9 | 0 |
| | | Version 10 | 0.3 |
| | | Version 11 | 0.5 |
| | | Other or Not Supported Versions | 0 |
| SEC_Q_07.3 | IF Google Chrome OS | Version 48 | 1 |
| | | Other or Not Supported Versions | −1 |
| SEC_Q_07.4 | IF Mac OS | OS X | 1 |
| | | Other or Not Supported Versions | −1 |
| SEC_Q_07.5 | IF Open SUSE | Version 13 | 0.5 |
| | | Leap 42.1 | 1 |
| | | Other or Not Supported Versions | −1 |
| SEC_Q_07.6 | If Red Hat Enterprise Linux | RHEL 5 | 0 |
| | | RHEL 6 | 0.5 |
| | | RHEL 7 | 1 |
| | | Other or Not Supported Versions | −1 |
| SEC_Q_07.7 | IF Other Linux | Ubuntu | 0 |
| | | CentOS | 0 |
| | | Debian | 0 |
| | | Oracle Linux | 0.5 |
| | | Mageia/Mandriva | 0 |
| | | ClearOS | 0 |
| | | Arch Linux | 0 |
| SEC_Q_08 | Enter Build Version | OPEN ENDED | |
| | | IF Most Current | 3 |
| | | IF Currently Supported | 1 |
| | | IF Not Supported | −2 |
| SEC_Q_09 | Software Framework | ASP .Net | 0.5 |
| | | C | −0.1 |
| | | C++ | −0.1 |
| | | COBOL | −0.1 |
| | | CFML | −0.5 |
| | | Common Lisp | −0.1 |
| | | D | −0.1 |
| | | Haskell | −0.1 |
| | | Java | 0.3 |
| | | JavaScript | 0.3 |
| | | Scala | −0.1 |
| | | Perl | −0.5 |
| | | PHP | −0.3 |
| | | Python | 0.1 |
| | | Ruby | −0.1 |
| | | Other | −1 |
| SEC_Q_09.1 | Enter Build Version | OPEN ENDED | |
| | | IF Most Current | 1 |
| | | IF Currently Supported | 0.5 |
| | | IF Not Supported | −2 |
| SEC_Q_10 | Software Architecture | Service-Oriented | 0.1 |
| | | Object-Oriented | 0.1 |
| | | Resource-Oriented | 0.1 |
| | | Other | −0.5 |
| SEC_Q_11 | HSM | Yes | 5 |
| | | No | −1 |
| SEC_Q_12 | Enter Manufacturer Name and Model | OPEN ENDED | |
| | | FIPS | 2 |
| | | PCI | 2 |
| | | IF Not Supported | −1 |
| SEC_Q_13 | Device Type | SE | 10 |
| | | HCE | 3 |
| | | TEE | 1 |
| | | Other | 0 |
| SEC_COM_01 | PCI DSS Validation | Yes | 5 |
| | | No | −1 |
| SEC_COM_01.1 | IF Yes, Assessor Type | QSA | 1 |
| | | ISA | 0.5 |
| | | Self-Assess | −1 |

TABLE 1-continued

| Question ID | Attribute | Response | VRS Impact |
|---|---|---|---|
| SEC_COM_01.2 | IF Yes, Validation Type | ROC | 1 |
| | | SAQ D | 0.5 |
| | | Other | −1 |
| SEC_COM_01.3 | If Service Provider, Check MC List | Yes | 1 |
| | | No | −1 |
| SEC_COM_02 | PA-DSS Validation | Yes | 3 |
| | | No | 0 |
| SEC_COM_02.1 | If yes, what version? | OPEN ENDED | |
| | | On PCI SSC Listing | 1 |
| | | Not on PCI SSC Listing | −1 |
| SEC_COM_04 | IF TSP, PCI TSP Validation | Yes | 3 |
| | | No | 0 |
| SEC_DSG_01 | Segmentation | Yes | 1 |
| | | No | −1 |
| SEC_DSG_02 | Mutual Authentication | Yes | 1 |
| | | No | −1 |
| SEC_DSG_03 | Cryptographic Authentication | Yes | 1 |
| | | No | −1 |
| SEC_DSG_04 | Strong Cryptography | Yes | 1 |
| | | No | −1 |
| SEC_DSG_05 | PA-DSS 5.2 | Yes | 1 |
| | | No | −1 |
| SEC_FUN_01 | Strong Access Controls | Yes | 1 |
| | | No | −1 |
| SEC_FUN_02 | Prohibit Remote Access | Yes | 10 |
| | | No | −0.5 |
| SEC_FUN_03 | Logging, Monitoring & Alerting | Yes | 1 |
| | | No | −1 |
| SEC_FUN_04 | MFA | Yes | 0.5 |
| | | No | −0.5 |
| SEC_FUN_05 | IF PAN, not outside comms | Yes | 1 |
| | | No | −1 |
| SEC_FUN_06 | IF PAN, Secure Deletion | Yes | 1 |
| | | No | −1 |
| SEC_FUN_07 | Velocity Checking | Yes | 1 |
| | | No | −1 |

Typically, the assigned point values for each of the different answers/responses are initial default values from system requirements/design. The values are then configurable as desired, for example, based on particular applications being evaluated (and their functionality), historical data, etc. With that said, it should be appreciated that the assigned point values included in Table 1 (and referenced herein) are exemplary in nature only, and that any desired values may alternatively be used (e.g., depending on particular applications being evaluated, depending on desired scales to be used for vulnerability risk scores for applications, etc.).

Continuing with this example, Table 2 illustrates validation of exemplary responses from the developer 120 to each of the questions in Table 1, for example, as presented via an example vulnerability questionnaire interface for the payment application 118 (e.g., interface 400, etc.). Table 2 further includes a fifth "Misc." column for displaying "open ended" responses and handling of multi-part responses.

TABLE 2

| Question ID | Attribute | Response | VRS Impact | Misc. |
|---|---|---|---|---|
| SEC_Q_01 | Component Type | Credential Management | 0 | |
| SEC_Q_02 | Functions Provided | Generate & Map Tokens | −0.5 | |
| | | Generate Digitalized Card Data | 0 | |
| | | Generate Card Master Keys | −0.5 | |
| SEC_Q_03 | Card Product Type | Credit | 0 | |
| | | Debit | −0.1 | |
| SEC_Q_04 | Primary Data Type | PAN | −1 | |
| SEC_Q_05 | Data Center Provider | Issuer | 0.5 | |
| SEC_Q_06 | Host Server Type | Microsoft Windows | −0.5 | |
| SEC_Q_07 | Operating System | OPEN ENDED | | Response: Windows |
| | Version | IF Currently Supported | 0.5 | |

TABLE 2-continued

| Question ID | Attribute | Response | VRS Impact | Misc. |
|---|---|---|---|---|
| SEC_Q_07.1 | IF Microsoft Windows | Windows 7 | 1 | |
| SEC_Q_09 | Software Framework | ASP .Net | 0.5 | Response: v4.5.1 |
| | | C | −0.1 | |
| | | C++ | −0.1 | |
| | | Fortinet | −0.1 | Response: v4.3.12 |
| SEC_Q_09.1 | Enter Build Version | IF Currently Supported | 0.5 | |
| SEC_Q_10 | Software Architecture | Service-Oriented | 0.1 | |
| SEC_Q_11 | HSM | Yes | 5 | |
| SEC_Q_12 | Enter Manufacturer Name and Model | OPEN ENDED | | Response: PCI |
| | | FIPS | 2 | |
| | | PCI | 2 | |
| | | IF Not Supported | −1 | |
| SEC_Q_13 | Device Type | SE | 10 | |
| SEC_COM_01 | PCI DSS Validation | Yes | 5 | |
| SEC_COM_01.1 | IF Yes, Assessor Type | QSA | 1 | |
| SEC_COM_01.2 | IF Yes, Validation Type | ROC | 1 | |
| | | SAQ D | 0.5 | |
| SEC_COM_01.3 | If Service Provider, Check MC List | Yes | 1 | |
| SEC_COM_02 | PA-DSS Validation | Yes | 3 | |
| SEC_COM_02.1 | If yes, what version? | OPEN ENDED | | Response: V1.x |
| | | On PCI SSC Listing | 1 | |
| SEC_COM_04 | IF TSP, PCI TSP Validation | Yes | 3 | |
| SEC_DSG_01 | Segmentation | Yes | 1 | |
| SEC_DSG_02 | Mutual Authentication | Yes | 1 | |
| SEC_DSG_03 | Cryptographic Authentication | Yes | 1 | |
| SEC_DSG_04 | Strong Cryptography | Yes | 1 | |
| SEC_DSG_05 | PA-DSS 5.2 | Yes | 1 | |
| SEC_FUN_01 | Strong Access Controls | Yes | 1 | |
| SEC_FUN_02 | Prohibit Remote Access | Yes | 10 | |
| SEC_FUN_03 | Logging, Monitoring & Alerting | Yes | 1 | |
| SEC_FUN_04 | MFA | Yes | 0.5 | |
| SEC_FUN_05 | IF PAN, not outside comms | Yes | 1 | |
| SEC_FUN_06 | IF PAN, Secure Deletion | Yes | 1 | |
| SEC_FUN_07 | Velocity Checking | Yes | 1 | |

Based on the exemplary responses in Table 2, the risk engine 122 calculates an initial vulnerability risk score for the payment application 118, based on validation of the infrastructure details and the compliance details for the payment application 118, by summing the VRS impact point values for each of the developer's responses. In this example, the initial vulnerability risk score is 54.2.

Further in this example, in calculating a final vulnerability risk score for the payment application 118, the risk engine 122 also takes into account vulnerability information collected from the external data structures 126. Table 3 illustrates a listing of example vulnerability query results from the NIST NVD vulnerability database (broadly, one of the external data structures 126), for example, with respect to the payment application 118 being analyzed. In connection therewith, the Common Vulnerability Scoring System (CVSS) was utilized (with the score impact calculation generally taking an inverse of the CVSS score, when applied to the verification risk score). As shown, the queries to the NIST NVD vulnerability database returned five vulnerability results, each having a different impact on the final vulnerability risk score for the payment application 118.

TABLE 3

| Vulnerability Database Output | Vulnerability Database | Vulnerability Record | Scoring System | VRS Impact |
|---|---|---|---|---|
| Fortinet FortiOS 4.3.12 | NIST NVD | CVE-2015-5965 | CVSS | −5 |
| SSL v3.0 with OpenSSL | NIST NVD | CVE-2014-3566 | CVSS | −3.1 |
| ASP.NET 4.5.1 Cross-Site Scripting | NIST NVD | CVE-2015-6099 | CVSS | −4.3 |
| ASP.NET 4.5.1 Denial of Service | NIST NVD | CVE-2015-2526 | CVSS | −5 |
| ASP.NET customErrors | NIST NVD | CVE-2015-1648 | CVSS | −2.6 |

Taking into account the vulnerability query results from the NIST NVD vulnerability database, the risk engine 122 calculates the final vulnerability risk score for the payment application 118 by summing the initial vulnerability risk score relating to infrastructure and compliance validation (i.e., 54.2 in this example) and the VRS impact point values for each of the query results in Table 3 (relating to vulnerability validation, i.e., −20 in this example). Thus, in this example, the final vulnerability risk score is 34.2, which is then compared to a threshold of 0, in this example, to determine whether to approve or deny the application 118. Since the final vulnerability risk score of 34.2 is greater than 0, the payment application 118, in this example, is approved.

It should again be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be further appreciated based on the foregoing specification, the above-described embodiments of the disclosure may be implemented using computer programming or engineering techniques including computer software, firmware, hardware or any combination or subset thereof, wherein the technical effect may be achieved by: (a) soliciting, by a computing device, application data associated with an application via a vulnerability questionnaire interface; (b) validating, by the computing device, the application data against at least one criterion; (c) determining, by the computing device, a vulnerability risk score of the application based on the application data; and either: (i) approving, by the computing device, the application when the vulnerability risk score satisfies an approval threshold; (ii) denying, by the computing device, the application when the vulnerability risk score satisfies a denial threshold; or (iii) referring, by the computing device, the application for manual decision when the vulnerability risk score satisfies a manual decision threshold between the approval threshold and the denial threshold.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for evaluating applications based on associated vulnerabilities, the method comprising:
    soliciting, by a computing device, application data associated with an application to be evaluated via a vulnerability questionnaire interface;
    validating, by the computing device, the application data against each of an infrastructure criterion, a compliance criterion, and a vulnerability criterion;
    assigning a first plurality of impact point values to the application data based on validation of the application data against two of: the infrastructure criterion, the compliance criterion, and the vulnerability criterion;
    assigning a second plurality of impact point values to the application data based on validation of the application data against the other one of: the infrastructure criterion, the compliance criterion, and the vulnerability criterion;
    combining the assigned first and second plurality of impact point values into a vulnerability risk score; and
    either:

approving, by the computing device, the application when the vulnerability risk score satisfies an approval threshold;

denying, by the computing device, the application when the vulnerability risk score satisfies a denial threshold; or referring, by the computing device, the application for manual decision when the vulnerability risk score satisfies a manual decision threshold between the approval threshold and the denial threshold.

2. The method of claim 1, wherein the infrastructure criterion includes an operating system criterion, a software framework criterion, a build version criterion, a software architecture criterion, a hardware security module criterion, and/or a device type criterion.

3. The method of claim 1, wherein the compliance criterion includes an environment compliance criterion, a data security compliance criterion, a facility criterion, and/or a token security compliance criterion.

4. The method of claim 1, wherein one of the first and second plurality of impact point values is further assigned based on validation of: an access control criterion, a suspicious activity response criterion, a multi-factor authentication criterion, a PAN security criterion, and/or a secure data retention and deletion criterion.

5. The method of claim 1, wherein one of the first and second plurality of impact point values is further assigned based on validation of: a secure internal network criterion, a mutual authentication communication criterion, an encrypted component communication criterion, a validated encryption criterion, a strong encryption security protocol criterion, and/or a vulnerability protection criterion.

6. The method of claim 1, further comprising provisioning the application with an authorization token when the application is approved.

7. The method of claim 1, further comprising receiving a decision when the application is referred for manual decision;

approving the application when the received decision indicates approval of the application; and denying the application when the received decision indicates denial of the application.

8. A system for evaluating applications based on associated vulnerabilities, the system comprising:

a processor; and a memory in communication with the processor, the memory including processor-executable instructions that, when executed by the processor, cause the processor to:

solicit application data, for an application to be evaluated, from a developer of the application via a questionnaire interface;

validate the application data against an infrastructure database;

validate the application data against a compliance database;

assign a first plurality of impact point values to the application data based on the validation of the application data against the infrastructure database and the compliance database;

validate the application data against a vulnerability database;

assign a second plurality of impact point values to the application data based on the validation of the application data against the vulnerability database;

combine the first plurality of impact point values and the second plurality of impact point values into a vulnerability risk score; and deny the application when the vulnerability risk score satisfies a denial threshold.

9. The system of claim 8, wherein the memory includes processor-executable instructions that, when executed by the processor, further cause the processor to:

approve the application when the vulnerability risk score satisfies an approval threshold; and refer the application for manual review when the vulnerability risk score satisfies a manual review threshold.

10. The system of claim 9, wherein the memory includes processor-executable instructions that, when executed by the processor, further cause the processor to:

receive a decision notification when the application is referred for manual review;

approve the application when the received decision notification indicates approval of the application; and deny the application when the received decision notification indicates denial of the application.

11. The system of claim 10, wherein the memory includes processor-executable instructions that, when executed by the processor, further cause the processor to provision the application with an authorization token when the application is approved.

12. The system of claim 11, wherein the memory includes processor-executable instructions that, when executed by the processor, further cause the processor to:

install an application instance of the application at a communication device when the application is approved;

link a payment account to the application instance; and facilitate a payment with the payment account via the application instance.

13. The system of claim 8, wherein the memory includes processor-executable instructions that, when executed by the processor in connection with validating the application data against an infrastructure database, a compliance database, and/or a vulnerability database, further cause the processor to compare the application data to criterion that includes an access control criterion, a suspicious activity response criterion, a multi-factor authentication criterion, a PAN security criterion, a secure data retention and deletion criterion, a secure internal network criterion, a mutual authentication communication criterion, an encrypted component communication criterion, a validated encryption criterion, a strong encryption security protocol criterion, and/or a vulnerability protection criterion.

14. A non-transitory computer readable media including processor-executable instructions for evaluating a payment application based on associated vulnerabilities, which when executed by a processor, cause the processor to:

validate application data for a payment application against an infrastructure database;

validate the application data for the payment application against a compliance database;

validate the application data for the payment application against a vulnerability database;

assign first impact points to the application data based on the validation of the application data of the payment application against one of the infrastructure database, the compliance database, and the vulnerability database;

generate a first score for the payment application based on the assigned first impact points;

assign second impact points to the application data based on the validation of the application data of the payment application against the other two of the infrastructure database, the compliance database, and the vulnerability database;

generate a second score for the payment application based on the assigned second impact points;

compile the first score and the second score, to thereby provide a vulnerability risk score for the payment application indicative of trustworthiness of the payment application regarding use of payment account information; and activate the payment application when the vulnerability risk score satisfies a threshold.

15. The non-transitory computer readable media of claim 14, wherein the processor-executable instructions, when executed by the processor, further cause the processor to: either:

deny the payment application when the vulnerability risk score fails to satisfy the threshold; or refer the payment application for manual review when the vulnerability risk score fails to satisfy the threshold.

16. The non-transitory computer readable media of claim 14, wherein the processor-executable instructions, when executed by the processor, further cause the processor to solicit the application data from a developer of the payment application via a vulnerability questionnaire interface;

wherein the vulnerability questionnaire interface includes an application provider information section, an application information section, an infrastructure details section, a compliance details section, a design details section, and/or a functional details section.

17. The non-transitory computer readable media of claim 14, wherein the infrastructure database includes an operating system criterion, a software framework criterion, a build version criterion, a software architecture criterion, a hardware security module criterion, and/or a device type criterion; and wherein the compliance database includes an environment compliance criterion, a data security compliance criterion, a facility criterion, and/or a token security compliance criterion.

18. The non-transitory computer readable media of claim 14, wherein the processor-executable instructions, when executed by the processor, cause the processor to assign one of the first impact points and the second impact points further based on: an access control criterion, a multi-factor authentication criterion, and/or a PAN security criterion.

19. The non-transitory computer readable media of claim 14, wherein the processor-executable instructions, when executed by the processor, cause the processor to assign one of the first impact points and the second impact points further based on: a secure internal network criterion, an encrypted component communication criterion, a validated encryption criterion, a strong encryption security protocol criterion, and/or a vulnerability protection criterion.

* * * * *